(12) United States Patent
Hirota

(10) Patent No.: US 7,890,506 B2
(45) Date of Patent: Feb. 15, 2011

(54) USER INTERFACE CONTROL APPARATUS AND METHOD THEREOF

(75) Inventor: Makoto Hirota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1736 days.

(21) Appl. No.: 10/889,072

(22) Filed: Jul. 13, 2004

(65) Prior Publication Data

US 2005/0015395 A1 Jan. 20, 2005

(30) Foreign Application Priority Data

Jul. 14, 2003 (JP) ............................. 2003-196555

(51) Int. Cl.
*G06F 7/00* (2006.01)
*G06F 17/00* (2006.01)
(52) U.S. Cl. ...................................... 707/736; 715/717
(58) Field of Classification Search .................. 707/600, 707/736; 715/717
See application file for complete search history.

(56) References Cited

U.S. PATENT DOCUMENTS 6,457,030 B1    9/2002  Adams et al. ............... 707/523
7,216,351 B1 *  5/2007  Maes ........................ 719/328
7,380,202 B1 *  5/2008  Lindhorst et al. ........... 715/204
2003/0033260 A1 *  2/2003  Yashiro et al. ............... 705/400
2003/0046316 A1 *  3/2003  Gergic et al. ................ 707/513
2004/0217985 A9 * 11/2004  Ries et al. ................... 345/740

FOREIGN PATENT DOCUMENTS

JP      2000-222276      8/2000
JP      2002-331938      11/2002

* cited by examiner

*Primary Examiner*—Luke S. Wassum
*Assistant Examiner*—Nicholas E Allen
(74) *Attorney, Agent, or Firm*—Fitzpatrick, Cella, Harper & Scinto

(57) ABSTRACT

The invention provides a user interface control apparatus and a method thereof, which can enhance operability of a user interface by replacing a presentation of a user interface designed by a developer of an application program with a UI component that is easy to use and is customizable for each user. A client computer acquires application software program that includes an element describing a presentation of a user interface and an element describing a data model expressed in the user interface by having a communication unit access an application server through a network. A UI component search unit searches a personal UI component library for a UI component having a presentation preferred by a user, which is replaceable with an element of the data model. A UI component replace unit replaces a second element of the application software with the searched for UI component.

3 Claims, 26 Drawing Sheets

FIG. 8

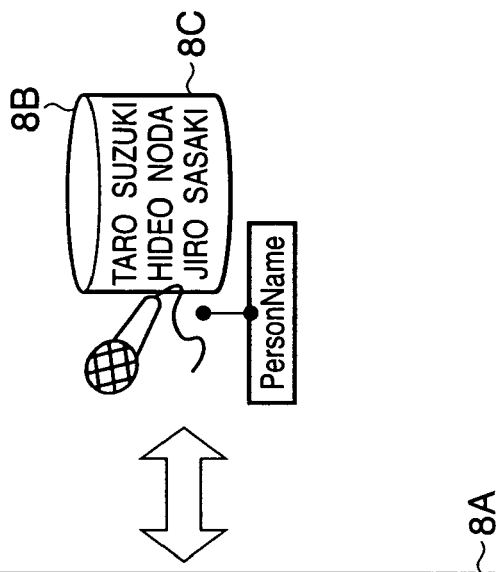

```
<?xml version="1.0" encoding="Shift_JIS"?>
<part xmlns="http://part"
      xmlns:xf="http://www.w3.org/2002/01/xforms">

<!--XForms Model -->
<xf:model>
  <xf:instance>
    <my:PersonName/>
  </xf:instance>
</xf:model>
<presentation>
  <listen ref="UserName">
    <grammar>
      <rule>
        <one-of>
          <item>TARO SUZUKI</item>
          <item>HIDEO NODA</item>
          <item>JIRO SASAKI</item>
        </one-of>
      </rule>
    </grammar>
  </listen>
</presentation>
</part>
```

8A

8B

8C

PersonName
TARO SUZUKI
HIDEO NODA
JIRO SASAKI

FIG. 9

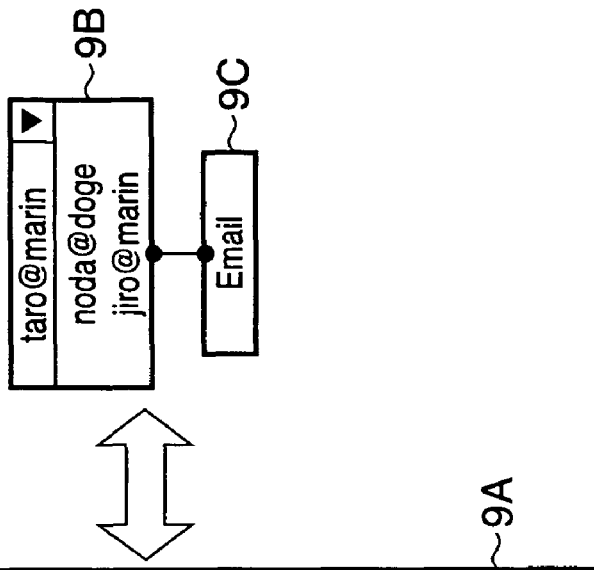

```
<?xml version="1.0" encoding="Shift_JIS"?>
<part xmlns="http://part"
    xmlns : xf="http://www.w3.org/2002/01/xforms"/>

<!--XForms Model -->
<xf : model>
    <xf : instance>
        <my : Email/>
    </xf : instance>
</xf : model>

<presentation>
    <select ref="Email">
        <option value="taro@marin">taro@marin</option>
        <option value="noda@doge">noda@doge</option>
        <option value="jiro@marin">jiro@marin</option>
    </select>
</presentation>
</part>
```

F I G. 10

| NAME | TARO SUZUKI ▼ |
|---|---|
| EMAIL | taro@marin ▼ |
| COMPANY | |
| ZIP CODE | |
| ADDRESS | |

LIST OF UI COMPONENT SEARCH RESULT

OK ~161

(1) ZIP CODE INPUT UI 1

YOU CAN LOOK UP ZIP CODE
BY FOLLOWING LINK OF THE
LOCATION...

| HOKKAIDO | AOMORI | IWATE | AKITA |
| MIYAGI | YAMAGATA | FUKUSHIMA | NIIGATA |
| IBARAKI | TOCHIGI | GUNMA | SAITAMA |
| CHIBA | TOKYO | KANAGAWA | YAMANASHI |

(2) ZIP CODE INPUT UI 2

YOU CAN LOOK UP ZIP CODE
BY CLICKING LOCATION IN
THE MAP...

FIG. 18

```
POST /UiComponentSearch.exe HTTP/1.1
Host : UIComponentServer2
Content-type : application/soap+xml ; charset="utf-8"
Content-length : xxx <env : Envelop>
   <env : Header>...</env : Header>
   <env : body>
      <UIPresentationSearch>
         <DataModelName>
            ZipCode
         </DataModelName>
      </UIPresentationSearch>
   </env : body>
</env : Envelop>
```

FIG. 19

```
HTTP1.1 200 OK
Date : Fri,19 Jul 2002 15:52:11 GMT
Content-type : application/soap+xml ; charset="utf-8"
Content-length : xxx <env : Envelop>
   <env : Header>...</env : Header>
   <env : body>
      <UIPresentationSearchResponce>

<part>
            ...DESCRIPTION OF UI COMPONENT CANDIDATE 1...
         </part>

<part>
            ...DESCRIPTION OF UI COMPONENT CANDIDATE 2...
         </part>

</UIPresentationSearchResponce>
   </env : body>
</env : Envelop>
```

```
<DataModelPairs>

<Pair>
        <item>ZipCode</item>
        <item>PostalCode</item>
    <Pair/>

<Pair>
        <item>PersonName</item>
        <item>UserName</item>
    <Pair/>

...
</DataModelPairs>
```

FIG. 26

```
POST /UiComponentSearch.exe HTTP/1.1
Host : UIComponentServer2
Content-type : application/soap+xml ; charset="utf-8"
Content-length : xxx <env : Envelop>
   <env : Header>...</env : Header>
   <env : body>
      <UIPresentationSearch>

<DataModelName>
            ZipCode
         </DataModelName>

<DataModelName>
            PostalCode
         </DataModelName>

</UIPresentationSearch>
   </env : body>
</env : Envelop>
```

USER INTERFACE CONTROL APPARATUS AND METHOD THEREOF

CLAIM OF PRIORITY

This application claims priority from Japanese Patent Application No. 2003-196555 filed on Jul. 14, 2003, the entire contents of which are incorporated herein by reference.

FIELD OF THE INVENTION

The present invention relates to a user interface control technique for expressing a user interface by executing an application software program comprising a data model and a presentation element that expresses the data model.

BACKGROUND OF THE INVENTION

Generally a software application program has a user interface designed by a developer of the program. A user interface is mostly a Graphical User Interface (GUI). The GUI allows a user to operate an application program by clicking a button of the GUI displayed on a computer screen or making selection from a pull-down menu with a mouse or a keyboard. Furthermore, recently as the speech recognition and speech synthesis techniques have advanced, operating an application program with a speech user interface has become possible.

Furthermore, a technique that realizes a user interface by describing the user interface in markup language and executing the markup language by a browser is also known. Currently prevailing HTML and web browsers are an example of this technique. Although the HTML and web browsers are originally a technique for browsing a document, they also enable interaction by virtue of the HTML Form and a CGI (Common Gateway Interface) mechanism on the web-server side. For instance, on a page of a search engine which performs search for a web content, a text box is provided for inputting a search word, and clicking a "search" button executes the search. Besides this, other styles for inputting various data on a web browser and transmitting data to a server are prevailing. In these examples, the HTML serves as the type of GUI markup language.

Meanwhile, a markup language called VoiceXML designed by W3C (World Wide Web Consortium) is a language for describing speech interaction.

A user interface is logically separated into an element of "data model" and an element of "presentation." The "data model" indicates what kind of data the application program is trying to obtain from a user through the user interface. In a case of the aforementioned search engine, the data to be obtained from a user is the "search word" that is a character string. Therefore, this is the data model of the search engine. This is by nature independent of the presentation of the user interface. The "presentation" indicates what kind of modality constitutes the user interface (e.g., GUI, speech, or the like). In a case of a GUI, the "presentation" indicates the appearance of the GUI.

In a case of the search engine, a GUI is adopted as a base, and a GUI component called a text box is allocated for inputting a search word. If a search word is limited to one of a plurality of character strings, a pull-down menu is used instead of a text box. Furthermore, in a case of a currently prevailing voice portal, the data to be obtained from a user is a character string called a "search word," and the corresponding presentation is a modality called speech input, instead of a text box.

As described above, a user interface of a "search" application program has a data model called a "search word" and various presentations can be allocated for the data model. The aforementioned W3C is designing a specification for a markup language called XForms. This is an XML-based markup language which can separately describe the presentation and data model of the user interface.

Most users normally operate an application program in accordance with the above-described presentation of the user interface designed by the program's developer.

However, since the presentation of the user interface used by respective users is designed by the program's developer as mentioned above, it is not always user friendly to all the users. For instance, in a user interface for inputting the name of the user, address, zip code and so on, it is often the case that a text field is allocated for each item and the user has to input data with a keyboard or the like.

Assuming the case of inputting a name in the name field of this user interface, in most cases the user inputs a name of his/her own or a name of a person close to the user. Therefore, it is easier for a user to select a name with a mouse from a pull-down menu having candidates of plural names, rather than to input the user name in the text field using a keyboard. Moreover, there are many users who prefer to use a user interface that can perform input by speech recognition having the plural name candidates as a recognition vocabulary.

Meanwhile, in a case of inputting a zip code, since users almost never remember all the zip codes, it is necessary to find a zip code using some kind of means and input the zip code in the text field from a keyboard or the like. However, there should be many users who think it is more convenient to find a zip code by clicking a place on a map or clicking a link with a user interface having an presentation such as URL:http://www1.sphere.ne.jp/yjk/postal/ that can be browsed on the Internet.

As described above, even for one data model, a preferable presentation of the user interface differs for each user. However, conventionally a user has no choice but to operate a user interface in accordance with the presentation of the user interface designed by the developer of the application program, and it has been impossible to allocate an presentation appropriate for each user.

SUMMARY OF THE INVENTION

The present invention has been proposed to solve the conventional problems, and has as its object to provide a user interface control apparatus and a method thereof, which can enhance operability of a user interface by replacing an presentation of the user interface designed by a developer of an application program with a UI (user interface) component that is easy to use for each user and customizing a user-friendly user interface.

In order to solve the above-described problem, a user interface control apparatus according to the present invention comprises:

acquisition means for acquiring an application software including a first element describing an presentation of a user interface and a second element describing a data model expressed in the user interface;

storage means for storing in pairs a third element describing a predetermined data model and a fourth element describing an presentation of the data model;

search means for searching the storage means for a third element which is replaceable with the second element of the application software; and replace means for replacing the first element of the application software with the fourth element, which is paired with the third element that is replaceable with the second element.

In order to solve the above-described problem, a user interface control method according to the present invention comprises:

an acquisition step of acquiring an application software including a first element describing an presentation of a user interface and a second element describing a data model expressed in the user interface;

a storage step of storing in pairs a third element describing a predetermined data model and a fourth element describing an presentation of the data model;

a search step of searching for a third element describing a predetermined data model, which is replaceable with the second element of the application software; and a replace step of replacing the first element of the application software with the fourth element, which is paired with the third element that is replaceable with the second element.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is an explanatory view of a UI component 602 registered in the personal UI component library 206 according to the first embodiment;

FIG. 9 is an explanatory view of a UI component 603 registered in the personal UI component library 206 according to the first embodiment;

FIG. 10 is a view showing a GUI presentation in a case where a part of the user interface components of an application software is replaced with the personal UI component library 206 according to the first embodiment;

FIG. 18 is a view showing an example of a search request message transmitted from the client computer 1101 to the UI component search server 1104 according to the second embodiment;

FIG. 19 is a view showing an example of a search result message returned from the UI component search server 1104 to the client computer 1101 according to the second embodiment;

FIG. 25 is a view showing a data description example of a data model pair list 2009 according to the third embodiment; and FIG. 26 is a view showing an example of a search request message transmitted from the client computer 2101 to the UI component search server 1104 according to the third embodiment.

DETAILED DESCRIPTION OF THE PREFERRED EMBODIMENTS

Preferred embodiments of the present invention will now be described in detail in accordance with the accompanying drawings.

First Embodiment

Figure 1:
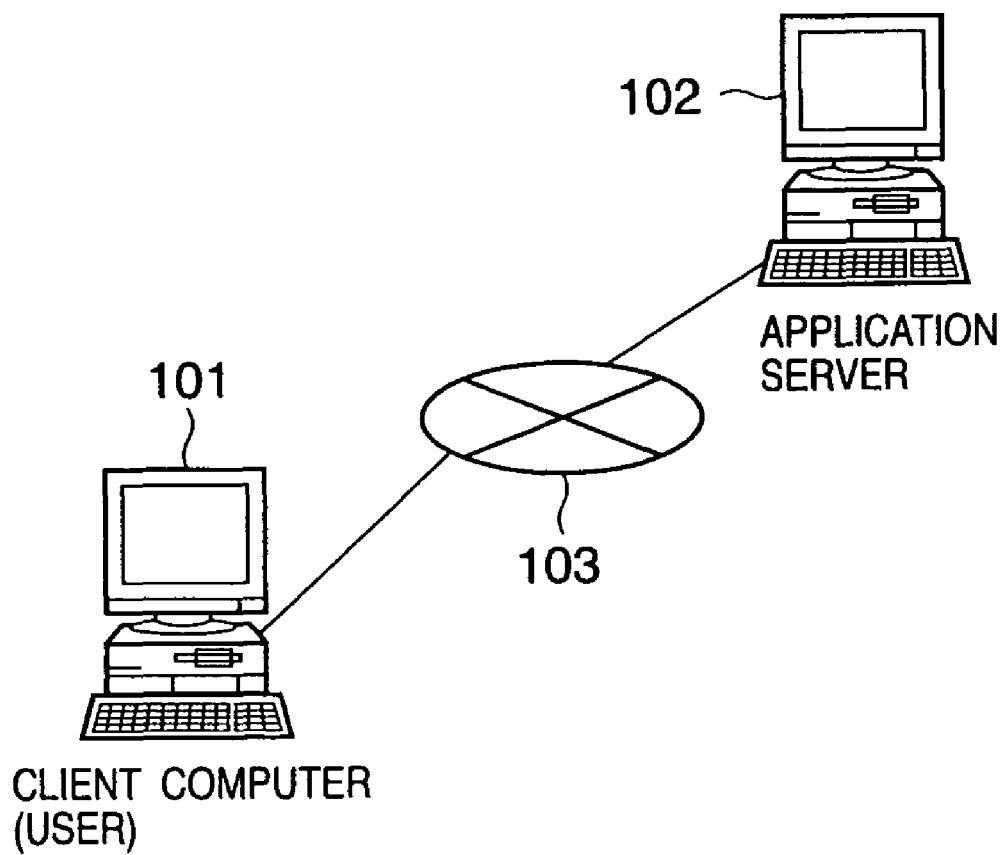
FIG. 1 is a diagram showing a structure of a user interface control system according to a first embodiment of the present invention.

FIG. 1 is a diagram showing a structure of a user interface control system according to the first embodiment of the present invention. As shown in FIG. 1, the first embodiment assumes a case where a user of a client computer downloads an application software provided by an application server through a network and operates the software. In FIG. 1, numeral 101 denotes a user's client computer; 102, an application server; and 103, a network such as the Internet.

Figure 2:
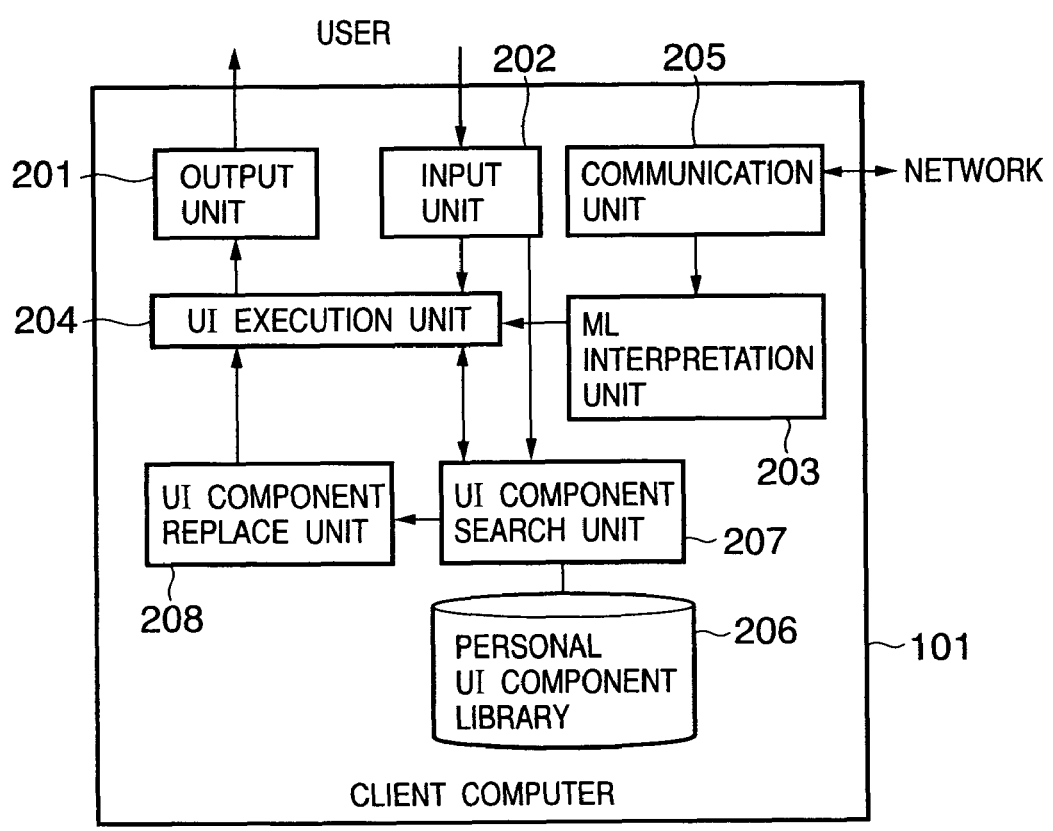
FIG. 2 is a block diagram showing a detailed construction of a client computer 101 according to the first embodiment.

FIG. 2 is a block diagram showing a detailed construction of the client computer 101 according to the first embodiment. Referring to FIG. 2, numeral 201 denotes an output unit, which is a module displaying a GUI and outputting speech. Numeral 202 denotes an input unit, which is a module receiving an input from a keyboard or a mouse to the GUI and a speech input. Numeral 203 denotes a ML (Markup Language) interpretation unit, which is a module interpreting a user interface markup language of an application software downloaded from the application server 102.

Numeral 204 denotes a UI (User Interface) execution unit which is a module executing the content of the user interface markup language. Numeral 205 denotes a communication unit which communicates with the application server 102 through the network 103, e.g., the Internet, to download a user interface markup language or transmit data inputted by a user to the application server 102. Numeral 206 denotes a personal UI component library where user interface presentations preferred by the user are collected for various data models. Each data model is described in the user interface markup language.

Numeral 207 denotes a UI component search unit which searches the personal UI component library 206 for a predetermined component (data model) by using the data model as a key, which is written in the user interface markup language of the application software downloaded from the application server 102. Numeral 208 denotes a UI component replace unit, which is a module replacing a user interface presentation with the user interface component searched by the UI search unit 207.

Figure 3:
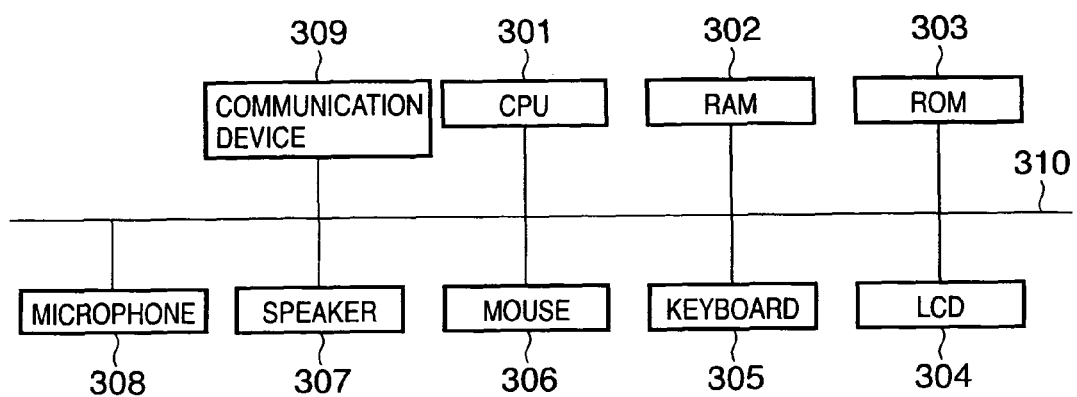
FIG. 3 is a block diagram showing a hardware construction of the client computer 101 according to the first embodiment.

FIG. 3 is a block diagram showing a hardware construction of the client computer 101 according to the first embodiment. In FIG. 3, numeral 301 denotes a Central Processing Unit (CPU) which performs operation in accordance with a program realizing a procedure that will be described later. Numeral 302 denotes RAM which provides a storage area necessary for operation of the program that will be described later. Numeral 303 denotes ROM which holds a program realizing a procedure that will be described later. Numeral 304 denotes a liquid crystal display (LCD) device which displays a GUI or the like. Numeral 305 denotes a keyboard serving as an input device; 306, a mouse serving as an input device; 307, a speaker performing audio output; 308, a microphone receiving speech input from a user; 309, a communication device performing communication with the application server 102 by connecting the client computer with the network 103 such as the Internet; and 310, an internal bus of the client computer 101.

Figure 5:
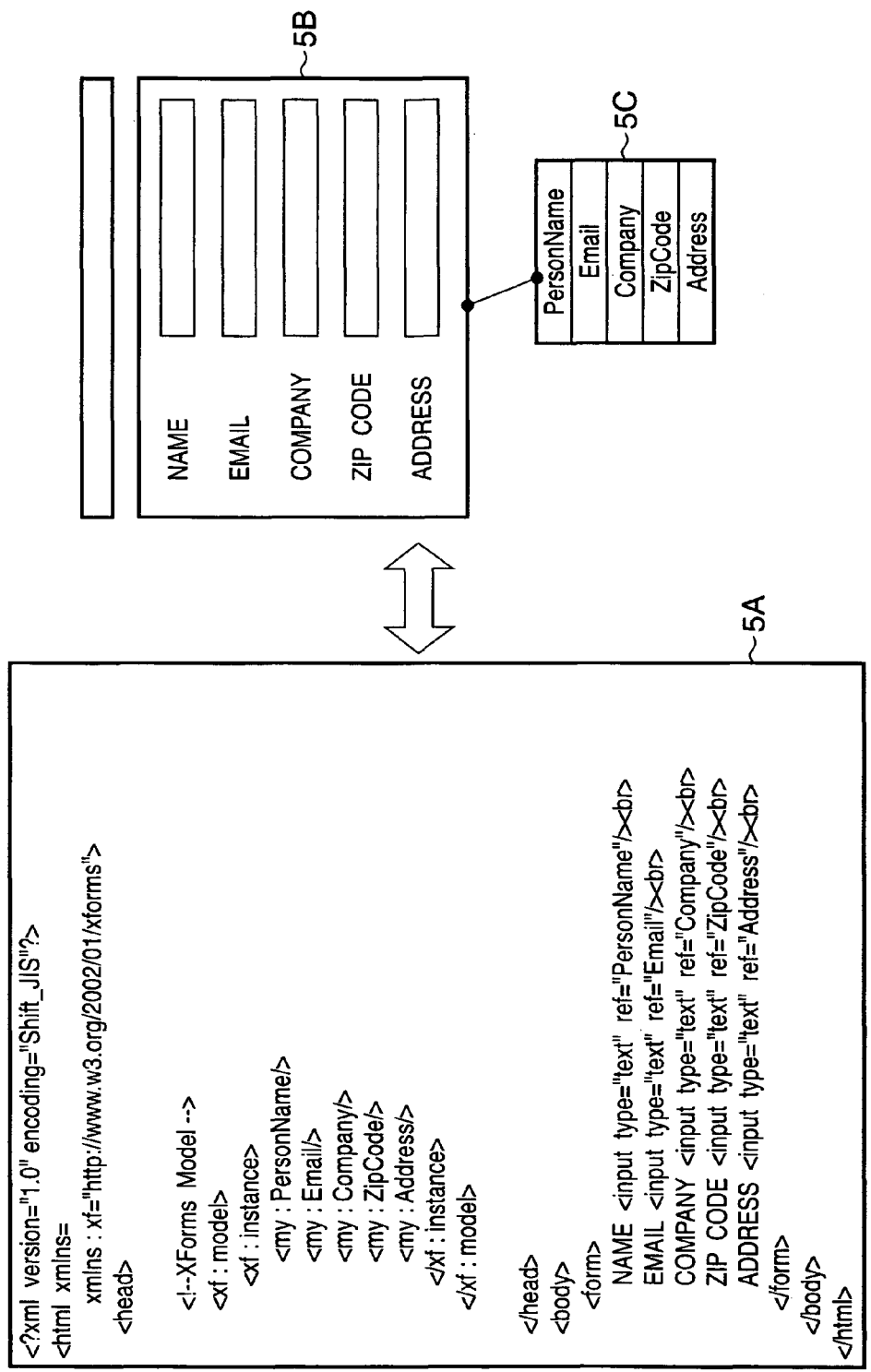
FIG. 5 is an explanatory view showing a user interface markup language used in the first embodiment and an example of a diagrammatic expression of the language.

Hereinafter, the user interface markup language is described before an operation procedure of the client computer 101 according to the present embodiment is described. FIG. 5 is an explanatory view showing the user interface markup language used in the first embodiment and an example of a diagrammatic expression of the language. As shown in 5A of FIG. 5, assume that the user interface markup language according to the first embodiment is written in XML (Extensible Markup Language). This user interface markup language is an example employing the language specifications XHTML and XForms, whose standardization is under way by the W3C.

In FIG. 5, the data content in the elements <xf:model>-</xf:model> expresses the data model. This example shows that the user interface is designed to input five data "Person-Name", "Email", "Company", "ZipCode" and "Address". Note that these are a specification of the XForms.

In 5A of FIG. 5, the data content in the elements <body>-</body> describes the presentation of the user interface. Herein, <input type="text"...> means a GUI text box, which is a specification of the XHTML. Furthermore, the attribute "ref" in the element <input/> indicates the corresponding data model, and is a specification of the XForms. In other words, the markup language shown in 5A of FIG. 5 indicates that each of the text boxes is used for inputting each of the five data "PersonName", "Email", "Company", "ZipCode" and "Address".

If the markup language shown in 5A of FIG. 5 is interpreted by the ML interpretation unit 203 and executed by the UI execution unit 204, a GUI presentation shown in 5B of FIG. 5 is realized. 5C of FIG. 5 shows a diagrammatic view of a data model, which is not displayed in reality. Hereinafter, a data model will be expressed as shown in 5C if FIG. 5.

Figure 6:
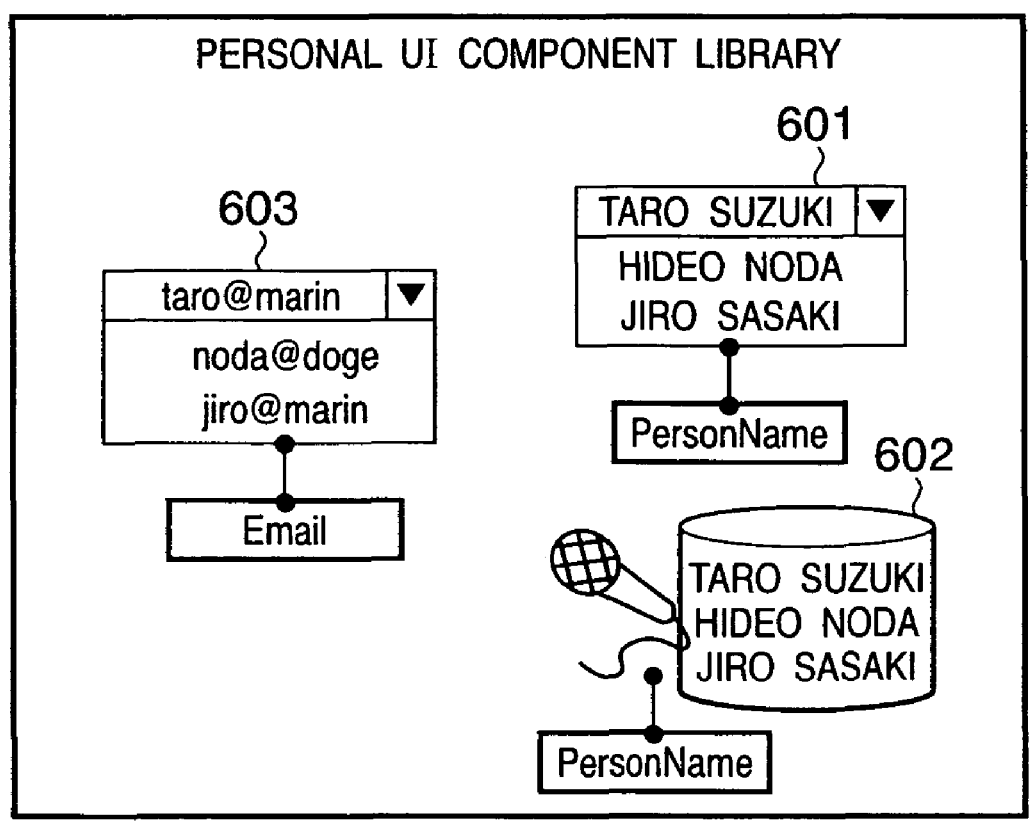
FIG. 6 is a view showing a diagrammatic expression of UI components registered in a personal UI component library 206 according to the first embodiment.

Next, the personal UI component library 206 is described. As mentioned above, UI components having an presentation preferred by the user are collected in the personal UI component library 206. FIG. 6 is a view showing a diagrammatic expression of UI components registered in the personal UI component library 206 according to the first embodiment. This embodiment assumes a case where three UI components corresponding to the data models "PersonName" and "Email" are registered in the personal UI component library 206 as shown in FIG. 6.

Figure 7:
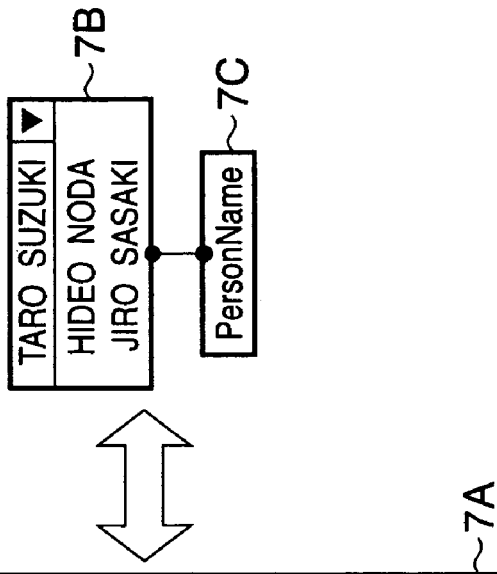
FIG. 7 is an explanatory view of a UI component 601 registered in the personal UI component library 206 according to the first embodiment.

FIG. 7 is an explanatory view of a UI component 601 registered in the personal UI component library 206 according to the first embodiment. 7A of FIG. 7 shows a markup language of the UI component 601 in FIG. 6; 7B of FIG. 7, GUI presentation of the language; and 7C of FIG. 7, a diagrammatic expression of the data model. As shown in 7A of FIG. 7, a UI component is written in the elements <part>-</part>. The presentation of the UI component is written in the elements <presentation>-</presentation>. FIG. 7 shows that a pull-down menu having three values: "Taro Suzuki", "Hideo Noda" and "Jiro Sasaki" is allocated to the UI component 601 for the data model "PersonName".

As shown in FIG. 5, the present embodiment is characterized in that the communication unit 205 acquires an application software, in which the first element that describes an interface presentation in a predetermined markup language and the second element that describes a data model in a predetermined markup language are separated.

FIG. 8 is an explanatory view of a UI component 602 registered in the personal UI component library 206 according to the first embodiment. FIG. 8 shows that an speech input is allocated to the same data model "PersonName" as that of FIG. 7. As shown in 8A of FIG. 8, the speech input component is written in the elements <listen>-</listen>. In the elements <grammar>-</grammar>, a speech recognition grammar of the speech input component (UI component 602) is written. In other words, 8A of FIG. 8 expresses that it has three recognition vocabularies: "Taro Suzuki", "Hideo Noda" and "Jiro Sasaki".

Similarly, FIG. 9 is an explanatory view of a UI component 603 registered in the personal UI component library 206 according to the first embodiment. In FIG. 9, a pull-down menu of the GUI component is allocated for the data model "Email".

By virtue of the above-described configuration, the communication unit 205 of the client computer 101 in the user interface control system according to the first embodiment can acquire an application software, which includes the first element describing the user interface presentation (e.g., elements <body>-</body> in 5A of FIG. 5) and the second element describing the data model expressed in the user interface (e.g., elements <xf:model>-</xf:model> in 5A of FIG. 5), from the application server 102 through the network 103. Furthermore, the personal UI component library 206 holds a third element describing a predetermined data model, such as a UI component, having a user-desired presentation. The UI component search unit 207 searches the personal UI component library 206 for the third element which is replaceable with the second element of the acquired application software. Then, the UI component replace unit 208 replaces the first element of the application software with the fourth element, which is paired with the third element searched by the UI component search unit 207 as a replaceable data model of the second element.

Figure 4:
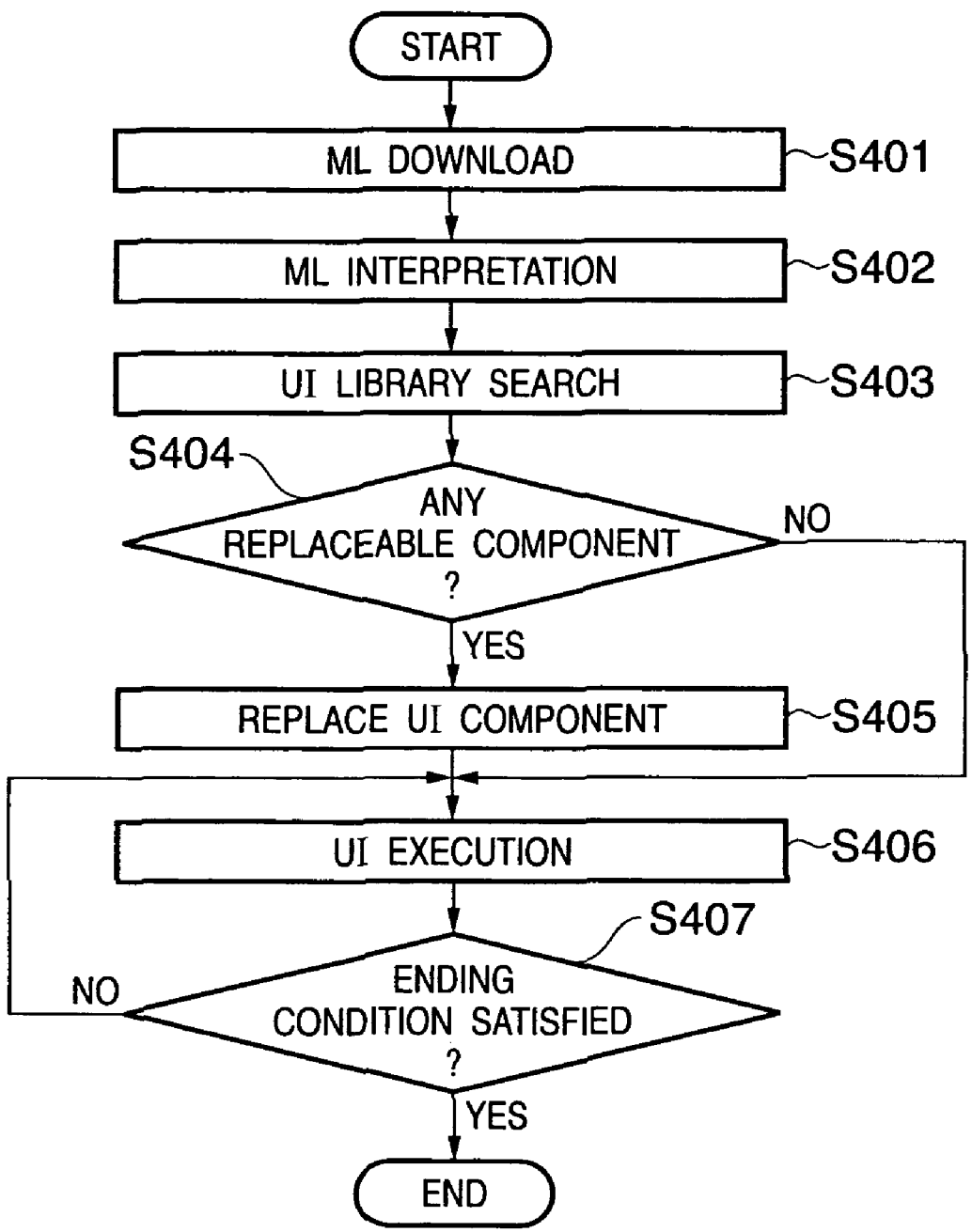
FIG. 4 is a flowchart describing an operation procedure of the client computer 101 according to the first embodiment.

Next, an operation procedure of the client computer 101 according to the first embodiment is described. FIG. 4 is a flowchart describing an operation procedure of the client computer 101 according to the first embodiment.

The communication unit 205 downloads a user interface markup language such as that shown in 5A of FIG. 5 from the application server 102 through the network 103 such as the Internet (step S401). Then, the ML interpretation unit 203 interprets the content of the language (step S402). Before the UI execution unit 204 starts executing the downloaded user interface markup language, the UI component search unit 207 searches the personal UI component library 206 for a UI component that is replaceable with the user interface markup language of the application software (step S403).

For instance, the user interface markup language shown in 5A of FIG. 5 describes a data model including five data elements: "PersonName", "Email", "Company", "ZipCode", and "Address". In step S403, UI components that are connected to such data models "PersonName", "Email", "Company", "ZipCode" are searched in the personal UI component library 206. As mentioned above, UI components that are easy to operate for each user are registered in the personal UI component library 206.

In this embodiment, there are two UI components connected to the data model "PersonName" and one UI component connected to the data model "Email" in the personal UI component library 206. Therefore, it is determined that there is a replaceable UI component (Yes in step S404). Then, the UI component replace unit 208 performs replacement of the UI component (step S405). More specifically, in place of the text box connected to the data model "PersonName" in the original user interface markup language, the searched UI component 601 having a pull-down menu which is connected to the "PersonName" is allocated.

Since the UI component 602 is also connected to the "PersonName", the UI component 602 is allocated as well. Herein, since the UI component 601 is a GUI component and the UI component 602 is an audio component, they do not conflict with each other and can exist together. Therefore, both components can be allocated. In step S405, the UI component 603 is allocated in place of the text box connected to the data model "Email" in the original user interface markup language.

In other words, the client computer 101 according to the first embodiment is characterized in that, in a case where the name of the data model (e.g., PersonName) described as the second element is of the same kind as the name of the user-desired data model (e.g., PersonName) described as the third element, the client computer 101 determines that the third element is replaceable and the UI component search unit 207 searches the personal UI component library 206 for the third element. Furthermore, the first embodiment is characterized in that the second element and the third element are both data models described in a character string, and that the UI component search unit 207 searches the personal UI component library 206 for the third element regarding the data model having the same character string as the character string of the data model regarding the second element of the application software.

FIG. 10 is a view showing a GUI presentation in a case where a part of the user interface components of the application software is replaced with the personal UI component library 206 according to the first embodiment. As shown in FIG. 10, in the user interface which is ultimately obtained as a result of the above-described processing, it is possible to input data in the "person" and "email" fields by selecting data from the pull-down menu, instead of inputting data in a text box using a keyboard. Furthermore, speech input is also possible in the "name" field.

Upon replacement processing in step S405, predetermined input is executed using the replaced user interface of the application software (step S406). If a replaceable data model is not found in the personal UI component library 206 in step S404 (No), the original user interface markup language is executed (step S406). In this case, the execution results in the GUI presentation shown in 5B of FIG. 5.

Then, it is determined whether or not a predetermined ending condition is satisfied (step S407). If it is satisfied (Yes), the control ends. If it is not satisfied (No), the control returns to step S406.

Second Embodiment

In the above-described first embodiment, the UI component library used in replacement is the "personal UI component library 206" held in the user's client computer 101. However, the UI component library may be provided by a third party other than the user, through a network to be made available for various users. Therefore, the second embodiment assumes that the user interface control system shown in FIG. 1 includes a UI component search server provided by a third party other than a user for providing UI components on the network, such as the Internet, in addition to the client computer 101 and application server 102.

Figure 11:
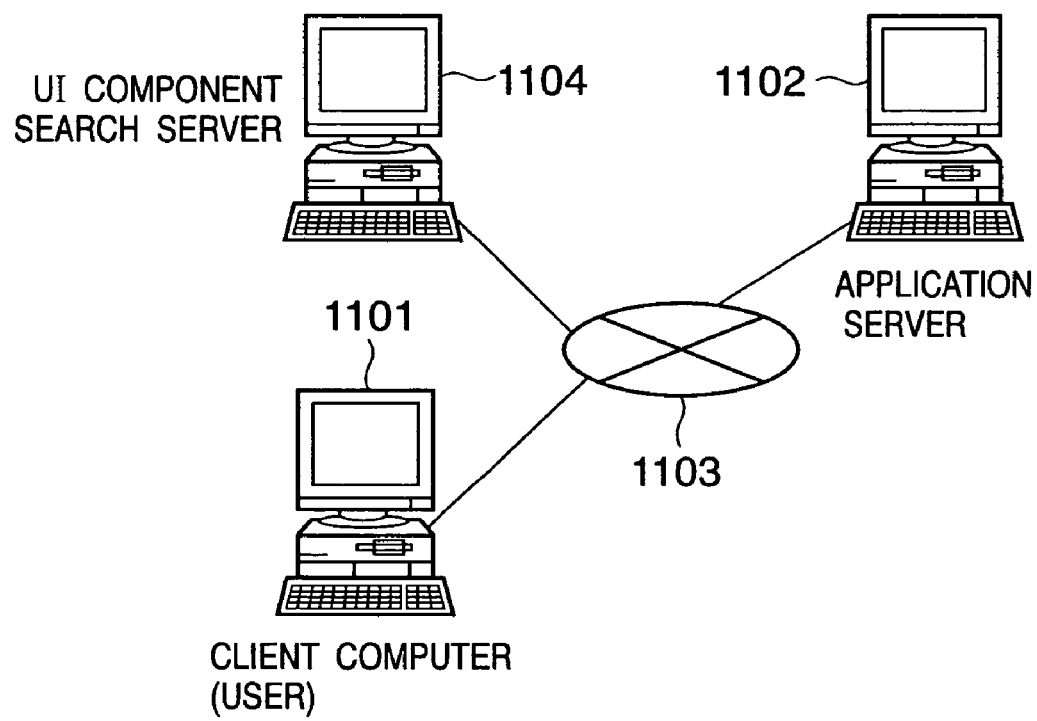
FIG. 11 is a diagram showing a structure of a user interface control system according to a second embodiment of the present invention.

FIG. 11 is a diagram showing a structure of a user interface control system according to the second embodiment of the present invention. In FIG. 11, numeral 1101 denotes a client computer; 1102, an application server; 1103, a network such as the Internet; and 1104, a UI component search server for providing UI components by a third party.

Figure 12:
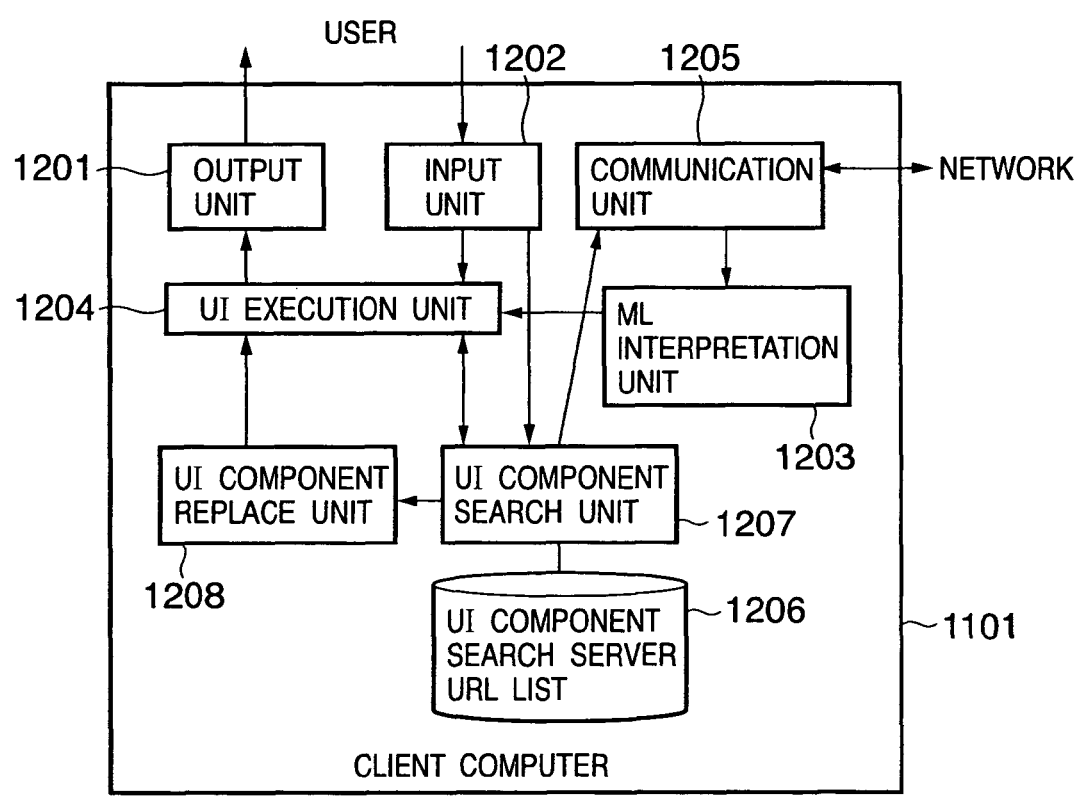
FIG. 12 is a block diagram showing a detailed construction of a client computer 1101 according to the second embodiment.

FIG. 12 is a block diagram showing a detailed construction of the client computer 1101 according to the second embodiment. Although the client computer 1101 shown in FIG. 12 has mostly the same construction as the client computer 101 shown in FIG. 1, the client computer 1101 differs from the computer 101 by having a UI search server URL list 1206 in place of the personal UI component library 206. The UI search server URL list 1206 records URLs of UI component search servers on the network 1103 such as the Internet, including the URL of the UI component search server 1104.

In other words, the user interface control system according to the second embodiment comprises: the client computer 1101 for acquiring an application software which includes a first element describing an presentation of a user interface and a second element describing a data model expressed in the user interface; and the UI component search server 1104 having the storage means for storing in pairs a third element describing a predetermined data model and a fourth element describing an presentation of the data model, and search means for searching the storage means for the third element which is replaceable with the second element of the application software. The user interface control system is characterized in that the client computer 1101 further comprises the UI component replace unit 1208 for replacing the first element of the application software with the fourth element, which is paired with the third element that is replaceable with the second element.

Figure 13:
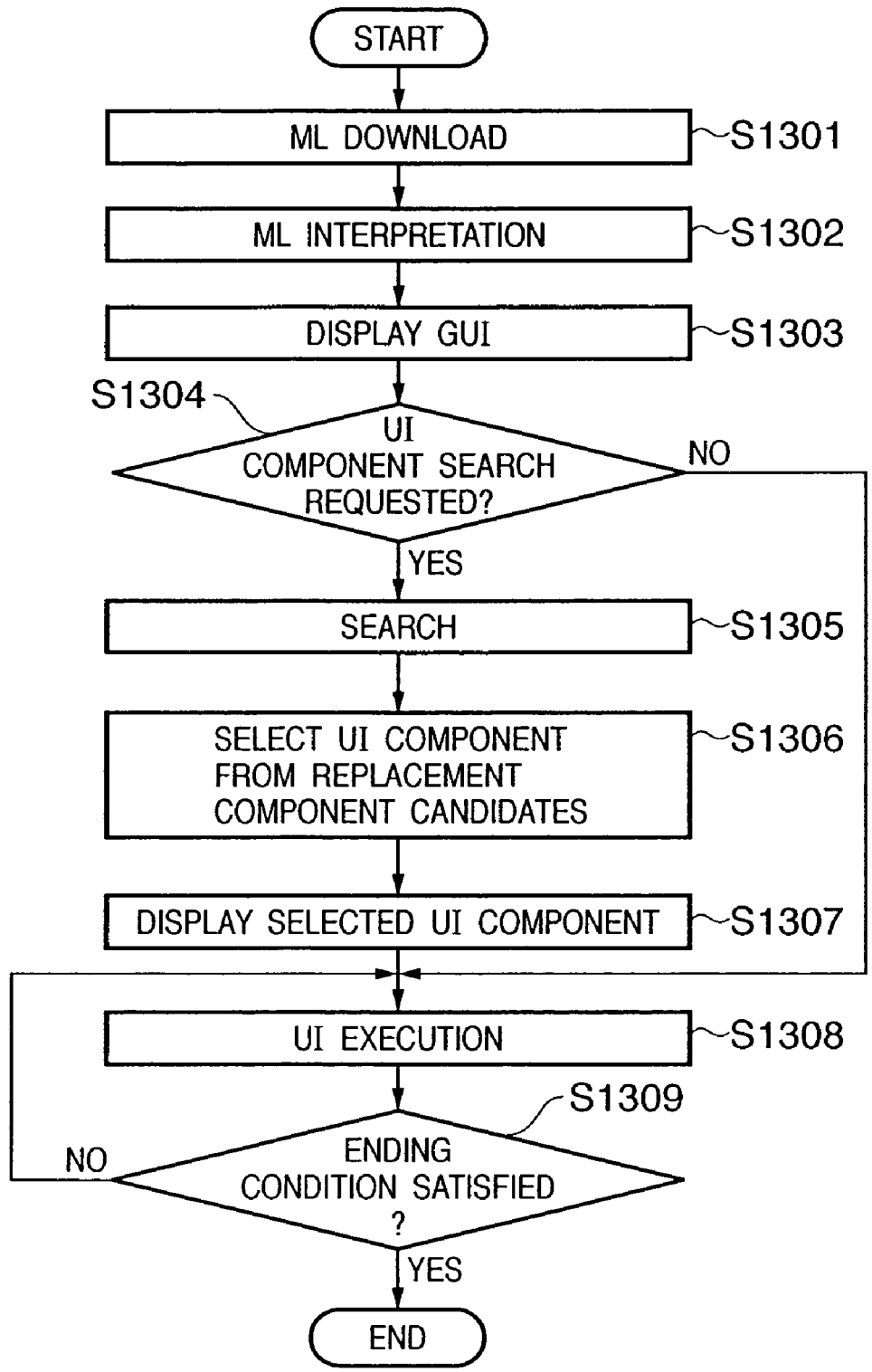
FIG. 13 is a flowchart describing an operation procedure of the client computer 1101 according to the second embodiment.

FIG. 13 is a flowchart describing an operation procedure of the client computer 1101 according to the second embodiment.

The communication unit 1205 downloads a user interface markup language such as that shown in 5A of FIG. 5 from the application server 1102 through the network 1103 such as the Internet (step S1301). Then, the ML interpretation unit 1203 interprets the content of the interface markup language (step S1302). In accordance with the description content of the user interface markup language, a GUI is displayed (step S1303). In this stage, a GUI such as that shown in 5B of FIG. 5 is displayed.

Figure 14:
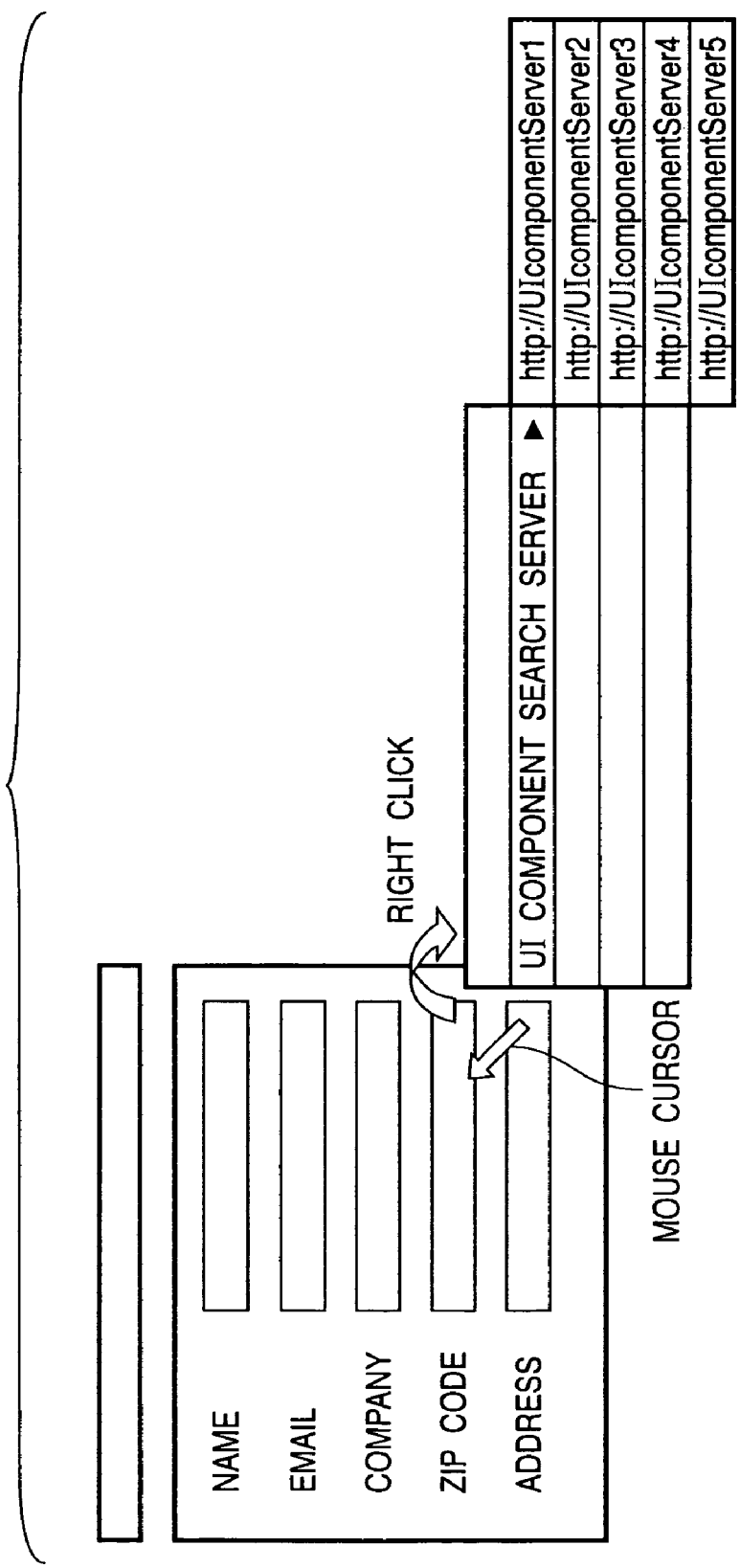
FIG. 14 is an explanatory view showing an example of a case where a user right-clicks the text box for replacing a component of the user interface of an application software according to the second embodiment.

According to the second embodiment, a user may input data utilizing this GUI, but can also search another UI component from the UI component search server 1104. FIG. 14 is an explanatory view showing an example of a case where a user right-clicks the text box for replacing a component of the user interface of the application software according to the second embodiment. For instance, when a user is looking for another simple UI for inputting a zip code, the user right-clicks the zip code field as shown in FIG. 14. As a result, a list of URLs of the UI component search server 1104 is displayed. By clicking an appropriate URL, a replacement UI component can be searched in the UI component search server that corresponds to the URL.

Figure 16:
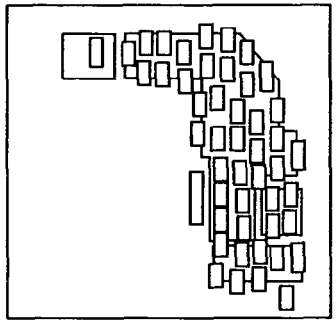
FIG. 16 is a view showing an example of a case where the client computer 1101 displays a search result returned by the UI component search server according to the second embodiment.
Figure 17:
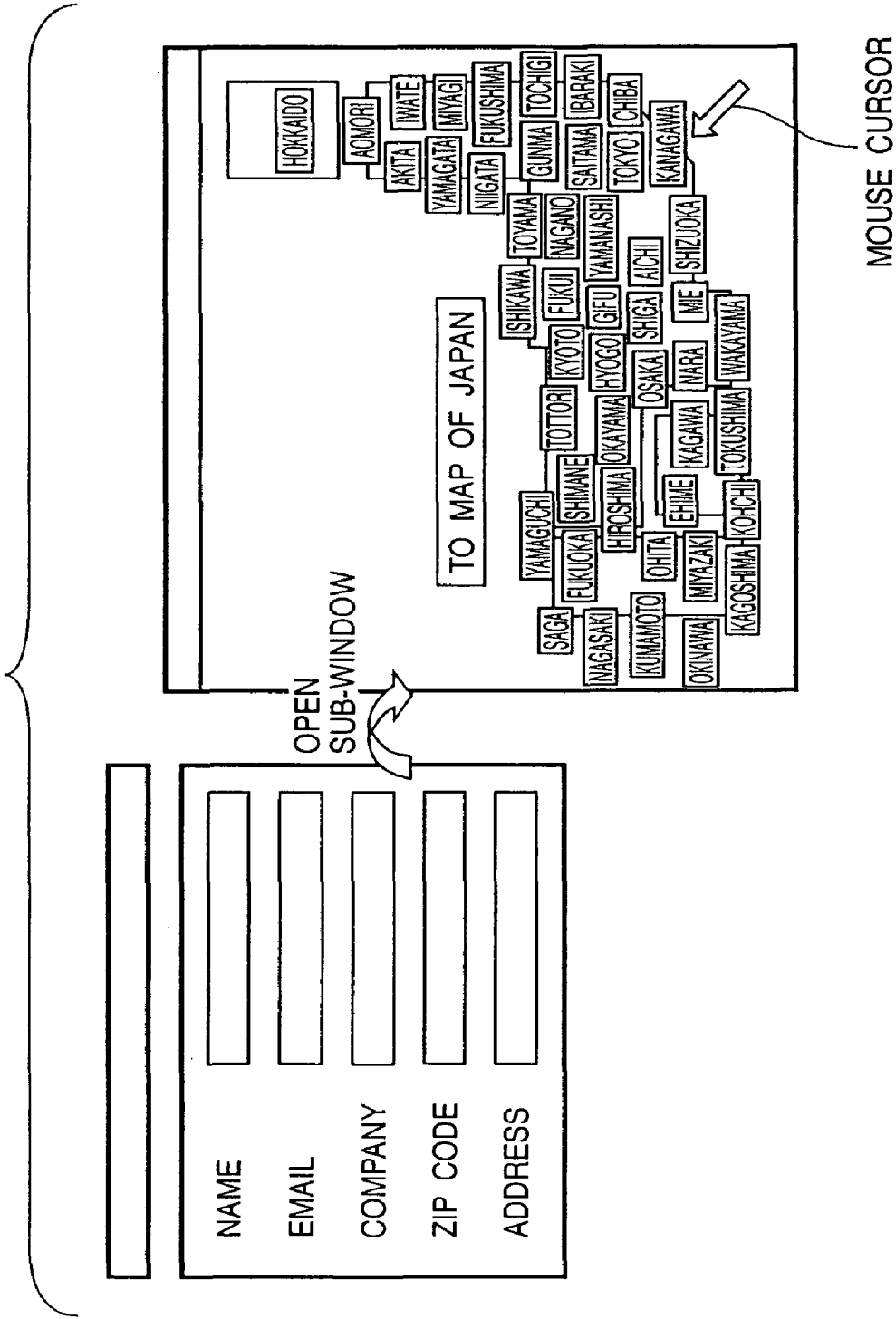
FIG. 17 is an explanatory view showing an example where a component of the user interface of an application software is replaced with a UI component included in the search result returned by the UI component search server according to the second embodiment.

FIG. 16 is a view showing an example of a case where the client computer 1101 displays a search result returned by the UI component search server according to the second embodiment. More specifically, as a search result, UI component candidates for inputting a zip code are listed, using thumbnail indication of the presentation with a simple description. By selecting an arbitrary UI component and clicking the "OK" button 161, the user can use the selected UI component on the sub-window shown in FIG. 17. FIG. 17 is an explanatory view showing an example where a component of the user interface of the application software is replaced with a UI component included in the search result returned by the UI component search server according to the second embodiment.

More specifically, according to the second embodiment, if the UI component search unit 1207 finds plural pairs (UI components) of third element and fourth element in the UI component search server URL list 1206, the output unit 1201 displays the information related to the pairs. An element selected from the plural pairs by the user using the input unit 1202 is adopted as the pair of third element and fourth element. Note that the similar processing may be performed in the above-described first embodiment and the following third embodiment, in a case where plural pairs of third element and fourth element are found in the search.

The above-described replacement operation is realized by steps S1304 to S1307 in FIG. 13. When a UI component search is requested by a user (e.g., right-click as mentioned above) (step S1304), the UI component search unit 1207 accesses the UI component search server URL list 1206 and extracts the URL list of the UI component search server 1104 to be provided to the user. When the user selects one from the list, the UI component search unit 1207 sends a search request to the selected URL (step S1305).

The search request includes information of the data model "ZipCode" connected to the target zip code field. In the second embodiment, a SOAP (Simple Object Access Protocol) message shown in FIG. 18 is transmitted in HTTP to the UI component search server 1104. FIG. 18 shows an example of the search request message transmitted from the client computer 1101 to the UI component search server 1104 according to the second embodiment.

Figure 15:
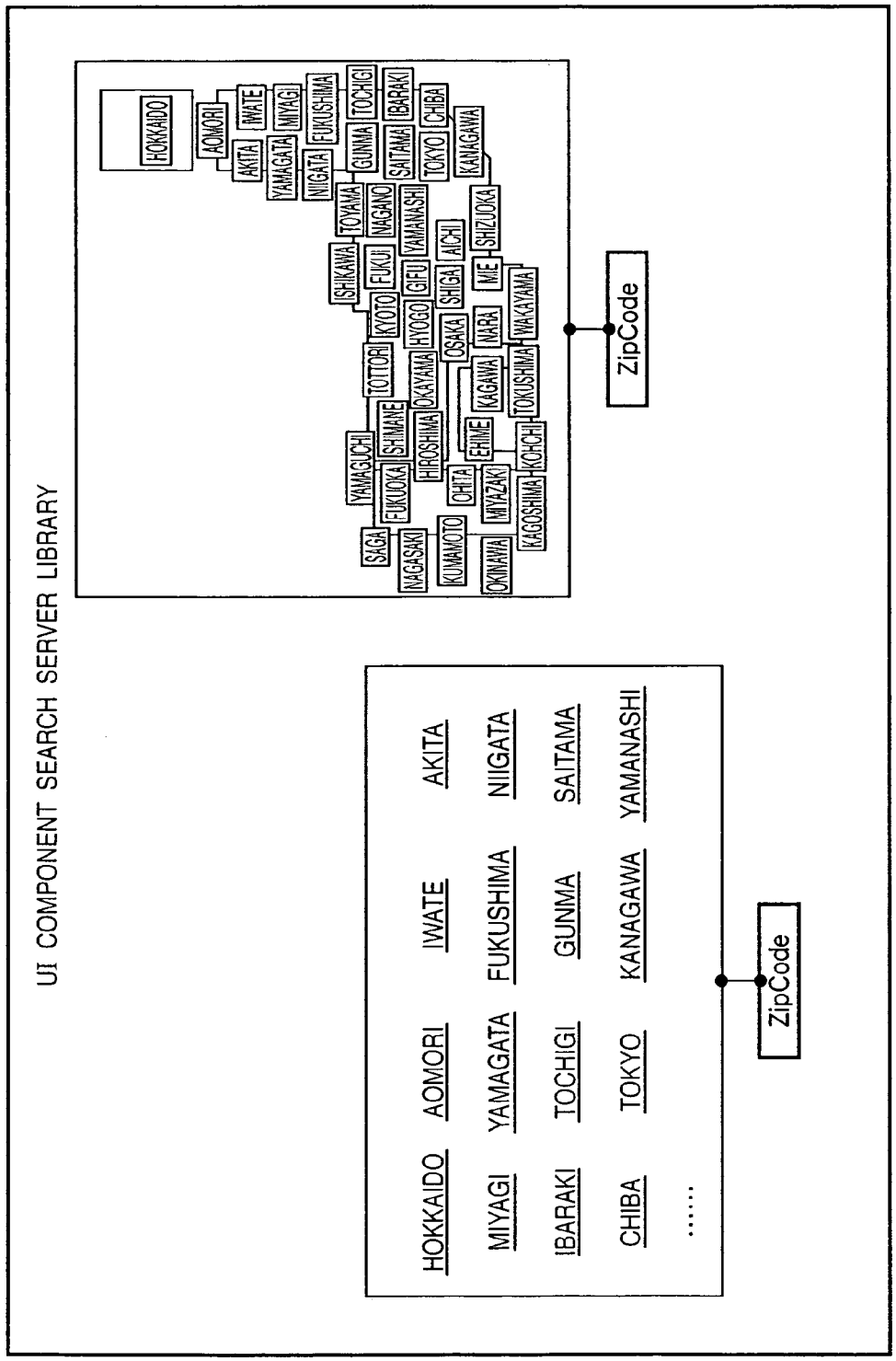
FIG. 15 is a view diagrammatically expressing an example of UI components registered in a UI component library held by a UI component search server 1104 according to the second embodiment.

Herein, the UI component search server 1104 which receives the search request message holds components shown in FIG. 15, as a user interface presentation connected to the data model "ZipCode". FIG. 15 is a view diagrammatically expressing an example of UI components registered in the UI component library held by the UI component search server 1104 according to the second embodiment. Note that the components shown in FIG. 15 are written in a markup language such as that shown in 7A of FIG. 7, 8A of FIGS. 8 and 9A of FIG. 9.

The UI component search server 1104 returns UI components such as that shown in FIG. 15 to the client computer 1101 as a SOAP return message shown in FIG. 19. FIG. 19 is a view showing an example of the search result message returned from the UI component search server 1104 to the client computer 1101 according to the second embodiment.

The client computer 1101 displays a list of UI components that are the search result embedded in the return message. The user selects one from the list (step S1306). Then, the UI execution unit 1204 of the client computer 1101 displays the selected UI component in a sub-window using the output unit 1201.

Third Embodiment

In the above-described embodiments, data model matching is realized by matching the character strings representing the data model. For instance, in order to replace the "name" field of the application user interface, a component having a data model of the same character string as the "PersonName" is searched in the library. This is done because there is an assumption that vocabularies representing the meaning of the data model are standardized, and that both the library side and the application side use the vocabulary "PersonName" for the data model representing a name. However, it is difficult to standardize vocabularies of all types of data models by matching the same character string. In view of this, the third embodiment describes an operation example in a case where the vocabulary of the data model is not standardized in advance.

Figure 20:
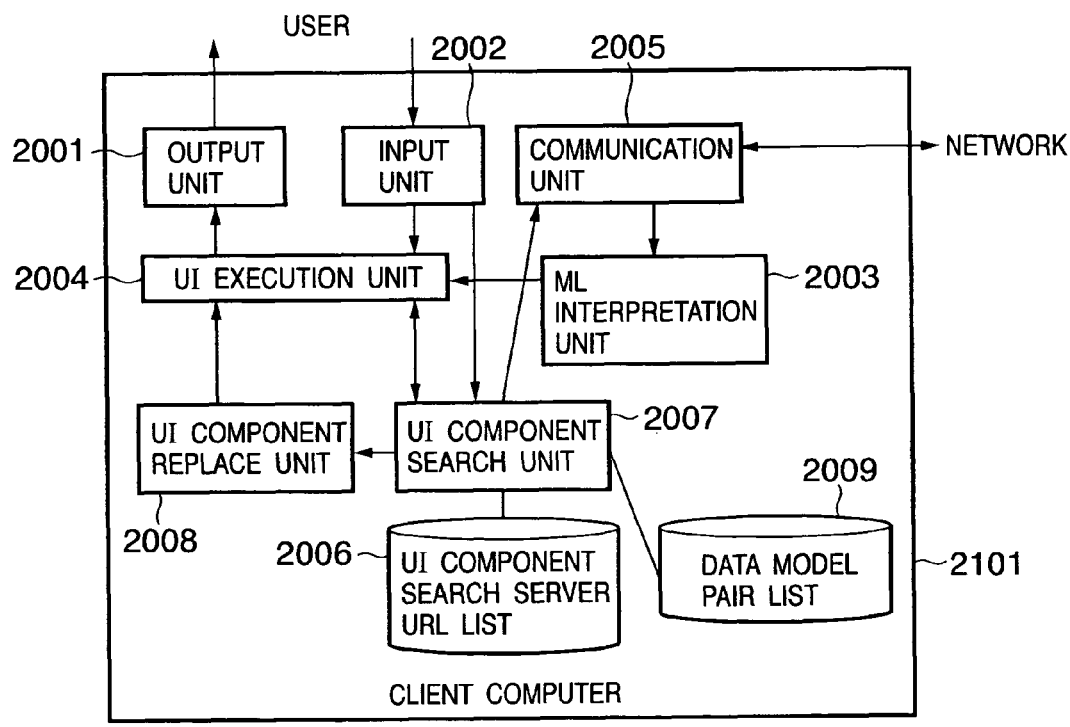
FIG. 20 is a block diagram showing a detailed construction of a client computer 2101 according to a third embodiment of the present invention.

The system construction according to the third embodiment is the same as that of the second embodiment shown in FIG. 11. However, it differs from the second embodiment in that the client computer has a configuration shown in the block diagram in FIG. 20. FIG. 20 is a block diagram showing a detailed construction of a client computer 2101 according to a third embodiment.

Figure 21:
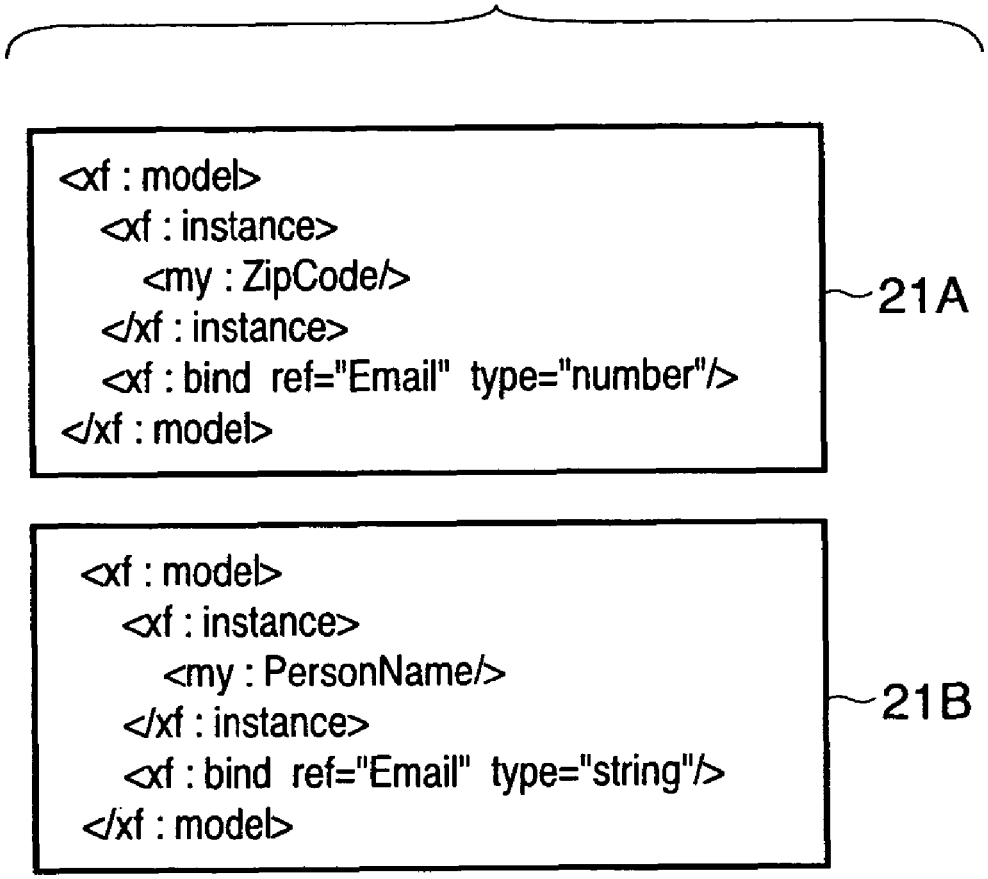
FIG. 21 is an explanatory view showing an example of a data model markup language including data-type designation according to the third embodiment.

According to the third embodiment, a description of the data model is expanded to define the type of data. This is realized by the known technique called XForms. FIG. 21 is an explanatory view showing an example of the data model markup language including data-type designation according to the third embodiment. In FIG. 21, the data type of a data element is described by having the element <xf:bind/> in the element <xf:model>-</xf:model> which describes the data model. For instance, 21A of FIG. 21 shows that the "Zip-Code" has a data type "number", and 21B of FIG. 21 shows that the "PersonName" has a data type "string" (character string).

Figure 22:
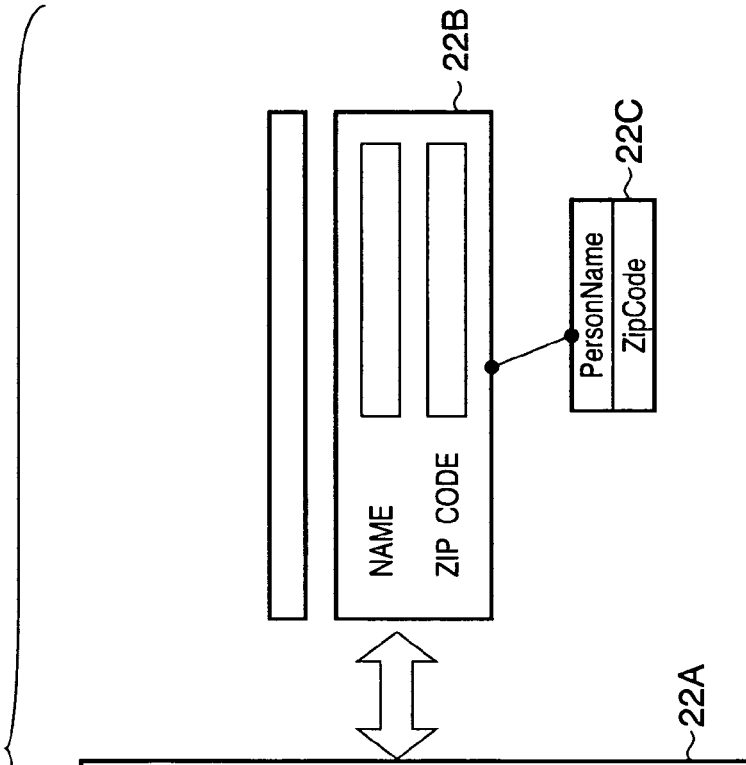
FIG. 22 is a view showing a user interface markup language of an application software used in the third embodiment and a diagrammatic expression of the language.

Next, assume that the application software has a user interface markup language shown in FIG. 22. FIG. 22 is a view showing a user interface markup language of an application software used in the third embodiment and a diagrammatic expression of the language. For instance, when a user outputs a search request of a replacement UI component for the "Zip Code" field, the UI component search server 1102 performs a search using the data model "ZipCode" as a key. As a result, if the search server 1102 cannot find a UI component having the data model named "ZipCode", then it searches a UI component connected to a data model having a data type "number".

In other words, the third embodiment is characterized in that, in a case where a data type of the data model described as the second element is of the same kind as a data type of the predetermined data model described as the third element, the UI component search unit 2007 determines that the third element is replaceable and searches the UI component search server URL list for the third element. Furthermore, the third embodiment is characterized in that the second element and the third element are data models in which a data type is described by an integer or a character string, and that the UI component search unit 2007 searches the UI component search server URL list for the third element regarding a data model having the same data type or a similar data type as that of the data model regarding the second element of the application software.

Figure 23:
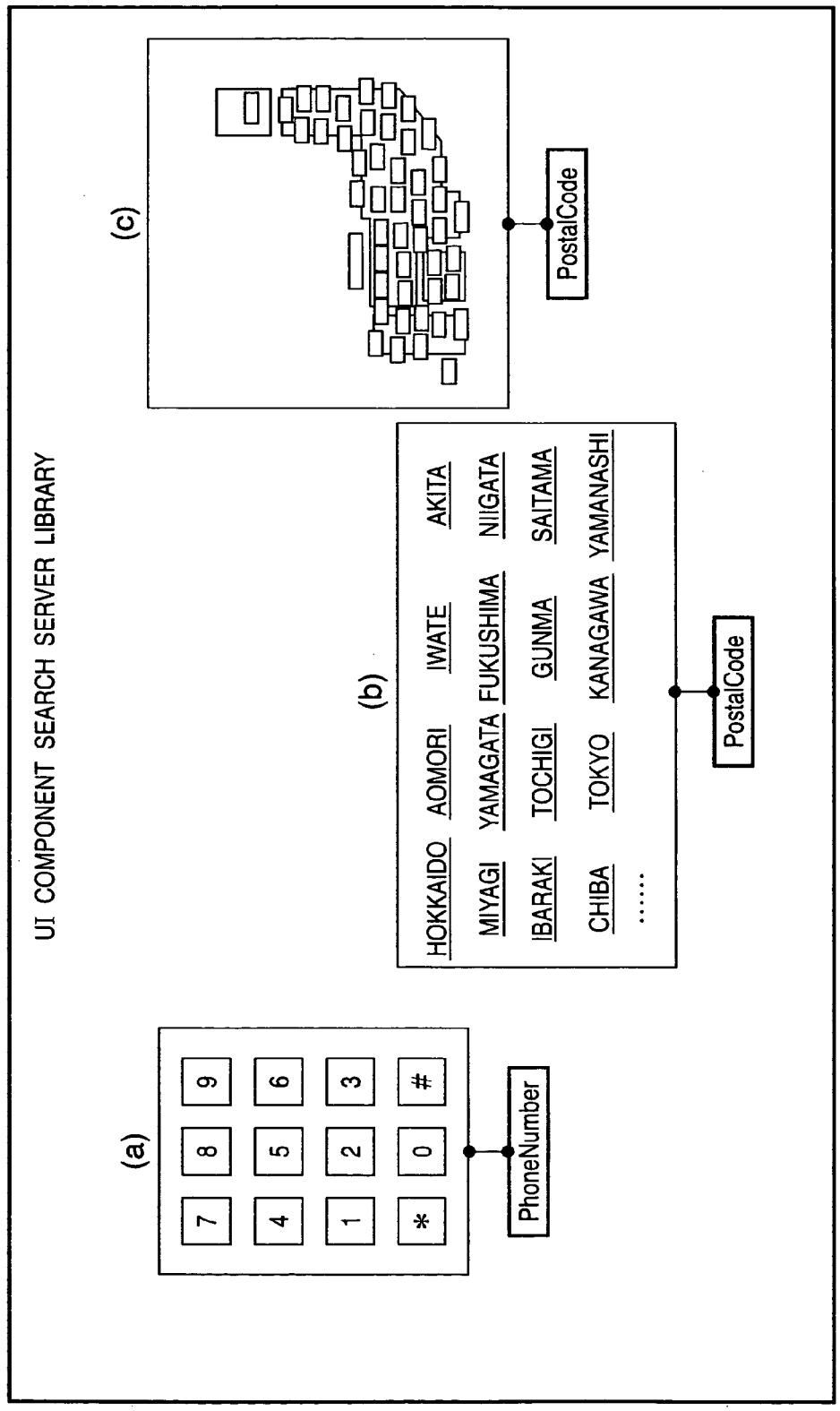
FIG. 23 is a view diagrammatically expressing a part of UI components registered in a UI component library held by the UI component search server 1104 according to the third embodiment.

FIG. 23 is a view diagrammatically expressing a part of UI components registered in the UI component library held by the UI component search server 1104 according to the third embodiment. Assume that three UI components shown in FIG. 23 find a match as a result of the above-described search according to the third embodiment. For instance, although a data model named "ZipCode" is not found, the search finds a hit in the UI components connected to "PhoneNumber" and "PostalCode" that match the data type "number". The UI component search server 1104 returns the search result to the client computer 2101, and the client computer 2101 displays the candidates as shown in FIG. 24.

Figure 24:
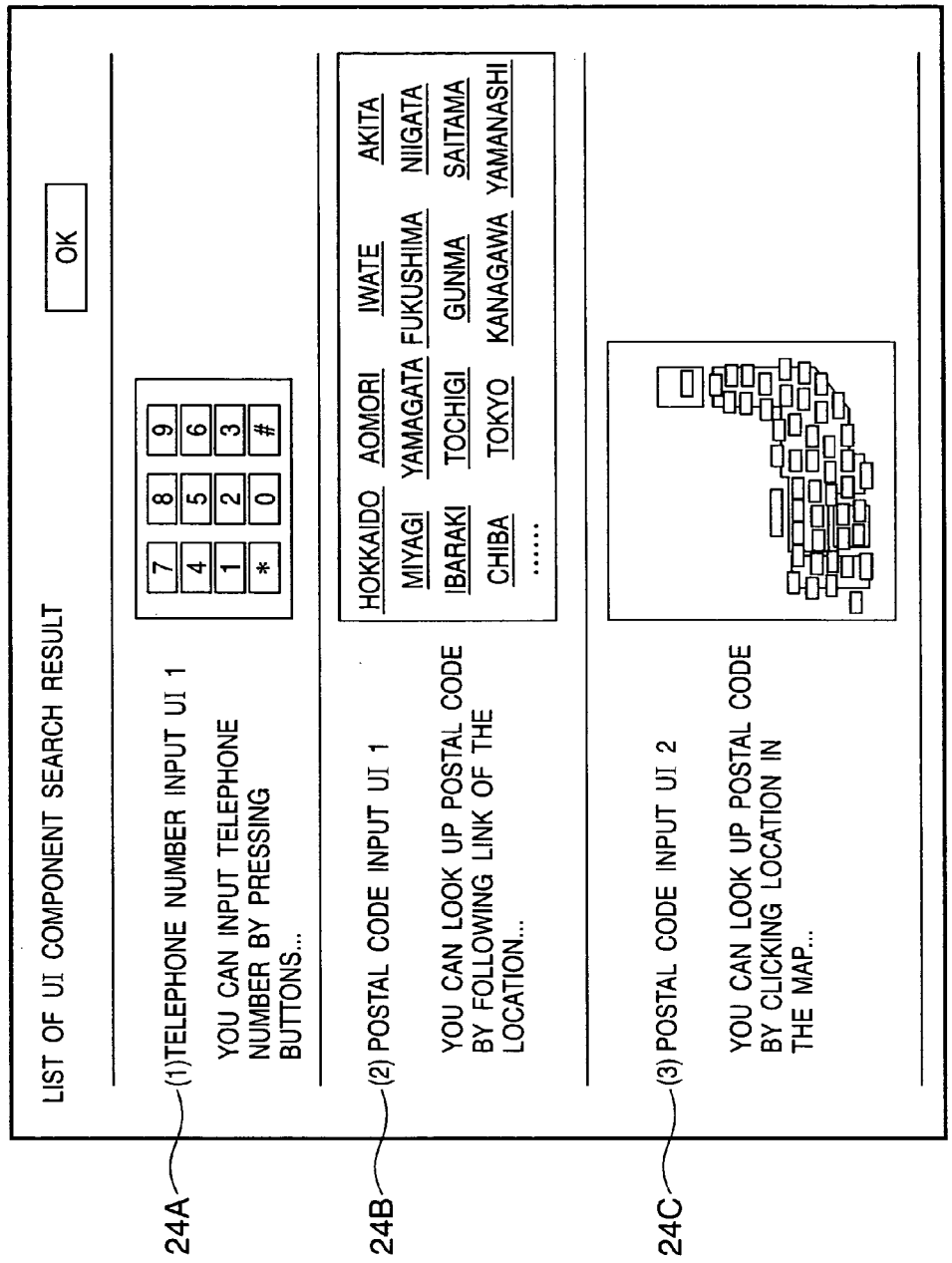
FIG. 24 is a view showing an example of a case where the client computer 2101 displays a search result returned by the UI component search server 1104 according to the third embodiment.

FIG. 24 is a view showing an example of a case where the client computer 2101 displays the search result returned by the UI component search server 1104 according to the third embodiment. Since the third embodiment performs matching by a data type, this search hits a UI component that is not appropriate for inputting a zip code (e.g., a UI component "telephone number input"). However, a zip code input UI component "PostalCode" can be found as shown in 24B and 24C of FIG. 24 even though the data model is described by "PostalCode" which is a different vocabulary from "ZipCode". Therefore, the user can select a component appropriate for inputting a zip code from the candidates displayed in FIG. 24 by the above-described method.

For instance, if the user selects the UI component shown in 24C of FIG. 24, it is possible to assume that the data model "PostalCode" of the selected UI component has the same meaning as the data model "ZipCode" of the application software. Therefore, the UI component search unit 2007 registers the data model pair ("ZipCode" and "PostalCode") in the data model pair list 2009. FIG. 25 shows a data description example of the data model pair list 2009 according to the third embodiment.

If one or more data model pairs are registered in the data model pair list 2009, the UI component search unit 2007 accesses the data model pair list 2009 before executing the UI component search to find another vocabulary having the same meaning as the searching data model. When the user wishes to perform a search using "ZipCode" on "PostalCode" is also added to the search request message since the data description example shown in FIG. 25 tells that they have the same meaning. FIG. 26 shows an example of the search request message transmitted from the client computer 2101 to the UI component search server 1104 according to the third embodiment.

For instance, in addition to the following message:

```
<DataModelName>
  ZipCode
</DataModelName>
``` the following message is added:

```
<DataModelName>
  PostalCode
</DataModelName>
```

By virtue of this, the matching probability in the vocabulary level can be improved.

In other words, the client computer 2101 according to the third embodiment is characterized by having the data model pair list 2009 in which data regarding the second element (e.g., ZipCode) and data regarding an element similar to the second element (e.g., PostalCode) are paired and registered. Based on the pairs registered in the data model pair list 2009, the UI component search unit 2007 searches the UI component search server URL list 2006 for data regarding the third element which is similar to the second element of the application software.

Other Embodiment

Although the above-described embodiments have described a case where the program is stored in the ROM, the present invention is not limited to this case. The above-described embodiments may be realized by using an arbitrary storage medium, or may be realized by a circuit performing a similar operation.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the computer-executable program may be executed in any form, such as an object code, a program executed by an interpreter, or scrip data supplied to an operating system.

Examples of computer-readable storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As has been described above, according to the present invention, the presentation of a user interface designed by a developer of an application program can be replaced with a UI component that is easy to use for each user, and a user-friendly user interface can be customized. As a result, it is possible to enhance operability of the user interface.

The present invention is not limited to the above embodiments and various changes and modification can be made within the spirit and scope of the present invention. Therefore, to apprise the public of the scope of the present invention, the following claims are made.

What is claimed is:

1. A user interface control apparatus comprising:
   an acquisition unit that acquires first data including a plurality of sets of first information and second information, the first information indicating a type of input content, and the second information indicating that the type of input content indicated by the first information should be input using a textbox displayed by a display unit;
   a storage unit that stores second data including a set of third information and fourth information, the third information being different from the first information, the third information indicating a type of input content, and the fourth information indicating that the type of input content indicated by the third information should be input using a Graphical User Interface (GUI) displayed by the display unit;
   a search unit that acquires one of the plurality of sets of first information included in the first data, searches the second data, and determines whether the third information included in the second data corresponds to the first information acquired by the acquisition unit; and
   a control unit that controls the display unit to display the GUI for inputting the type of input content indicated by the first information, based on the fourth information, without controlling the display unit to display the textbox for inputting the type of input content indicated by the first information based on the second information, when the third information included in the second data is determined to correspond to the first information acquired by the acquisition unit, and that controls the display unit to display the textbox for inputting the type of input content indicated by the first information, based on the second information, when the third information included in the second data is not determined to correspond to the first information acquired by the acquisition unit,
   wherein the GUI does not include the textbox and includes at least one of: a pull-down menu, a view of selected items, and a software keyboard.

2. A user interface control method performed by a user interface control apparatus that includes a central processing unit (CPU), the method comprising:
   acquiring first data including a plurality of sets of first information and second information, the first information indicating a type of input content, and the second information indicating that the type of input content indicated by the first information should be input using a textbox displayed by a display unit;
   storing second data including a set of third information and fourth information, the third information being different from the first information, the third information indicating a type of input content, and the fourth information indicating that the type of input content indicated by the third information should be input using a Graphical User Interface (GUI) displayed by the display unit;
   acquiring one of the plurality of sets of first information included in the first data;
   searching the second data;
   determining whether the third information included in the second data corresponds to the first information; and
   controlling the display unit to display the GUI for inputting the type of input content indicated by the first information, based on the fourth information, without controlling the display unit to display the textbox for inputting the type of input content indicated by the first information based on the second information, when the third information included in the second data is determined to correspond to the first information, and controlling the display unit to display the textbox for inputting the type of input content indicated by the first information, based on the second information, when the third information included in the second data is not determined to correspond to the first information,
   wherein the controlling is performed, at least in part, by the CPU, and
   wherein the GUI does not include the textbox and includes at least one of: a pull-down menu, a view of selected items, and a software keyboard.

3. A non-transitory computer-readable storage medium storing a computer-executable program that, when executed by a computer, causes the computer to perform a method comprising:
   acquiring first data including a plurality of sets of first information and second information, the first information indicating a type of input content, and the second information indicating that the type of input content indicated by the first information should be input using a textbox displayed by a display unit;

storing second data including a set of third information and fourth information, the third information being different from the first information, the third information indicating a type of input content, and the fourth information indicating that the type of input content indicated by the third information should be input using a Graphical User Interface (GUI) displayed by the display unit;

acquiring one of the plurality of sets of first information included in the first data;

searching the second data;

determining whether the third information included in the second data corresponds to the first information; and controlling the display unit to display the GUI for inputting the type of input content indicated by the first information, based on the fourth information, without controlling the display unit to display the textbox for inputting the type of input content indicated by the first information based on the second information, when the third information included in the second data is determined to correspond to the first information, and controlling the display unit to display the textbox for inputting the type of input content indicated by the first information, based on the second information, when the third information included in the second data is not determined to correspond to the first information, wherein the GUI does not include the textbox and includes at least one of: a pull-down menu, a view of selected items, and a software keyboard.

* * * * *